United States Patent
Simonsohn (10) Patent No.: US 9,537,247 B2
(45) Date of Patent: Jan. 3, 2017

(54) DETACHABLE CABLE JOINT WITH THREE SOCKETS

(71) Applicant: Tyco Electronics Raychem GmbH, Ottobrunn (DE)

(72) Inventor: Thilo Simonsohn, Munich (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 0 days.

(21) Appl. No.: 14/798,806

(22) Filed: Jul. 14, 2015

(65) Prior Publication Data

US 2015/0318635 A1     Nov. 5, 2015

Related U.S. Application Data

(63) Continuation of application No. PCT/EP2013/050591, filed on Jan. 14, 2013.

(51) Int. Cl.

| | |
|---|---|
| *H01R 13/53* | (2006.01) |
| *H01R 13/502* | (2006.01) |
| *H01R 13/02* | (2006.01) |
| *H01R 31/02* | (2006.01) |
| H01R 4/50 | (2006.01) |
| H01R 4/64 | (2006.01) |
| H01R 11/12 | (2006.01) |
| H02G 15/064 | (2006.01) |
| H02G 15/18 | (2006.01) |

(52) U.S. Cl.
CPC ............ *H01R 13/502* (2013.01); *H01R 13/02* (2013.01); *H01R 13/53* (2013.01); *H01R 31/02* (2013.01); *H01R 4/5016* (2013.01); *H01R 4/646* (2013.01); *H01R 11/12* (2013.01); *H02G 15/064* (2013.01); *H02G 15/18* (2013.01)

(58) Field of Classification Search
CPC . H01R 13/53; H01R 13/6485; H01R 2103/00; H01R 13/6666
USPC .................................................. 439/181, 921
See application file for complete search history.

(56) References Cited

U.S. PATENT DOCUMENTS

| | | | |
|---|---|---|---|
| 3,585,568 A | 6/1971 | Hervig et al. | |
| 3,980,374 A * | 9/1976 | Fallot ..................... | H01R 13/53 174/72 R |
| 4,764,123 A | 8/1988 | Shaw et al. | |
| 4,865,559 A * | 9/1989 | Clabburn ............... | H01R 13/53 439/281 |

(Continued)

FOREIGN PATENT DOCUMENTS

| | | |
|---|---|---|
| EP | 0510019 B1 | 8/1995 |
| FR | 2686195 A1 | 7/1993 |

OTHER PUBLICATIONS

PCT International Search Report, International Application No. PCT/EP2013/050591, dated Sep. 20, 2013, 4 pages.
Abstract of FR 2686195, dated Jul. 16, 1993, 1 page.

*Primary Examiner* — Gary Paumen
(74) *Attorney, Agent, or Firm* — Barley Snyder (57) ABSTRACT

A detachable cable joint is provided and includes a housing having a first socket, a second socket, a third socket, a first contact member, and a second contact member. The second socket is positioned adjacent to the first socket, while the third socket is positioned adjacent to the first socket and separate from the second socket. The first contact member connects the first socket and the second socket, while the second contact member connects the first socket and the third socket.

14 Claims, 12 Drawing Sheets

(56) References Cited

U.S. PATENT DOCUMENTS

| | | | | |
|---|---|---|---|---|
| 4,891,016 A * | 1/1990 | Luzzi | ............... | H01R 13/53 |
| | | | | 439/183 |
| 4,955,823 A * | 9/1990 | Luzzi | ............... | H01R 13/53 |
| | | | | 439/507 |
| 5,427,538 A * | 6/1995 | Knapp | ............... | H01R 13/53 |
| | | | | 439/157 |
| 6,042,407 A * | 3/2000 | Scull | ............... | H01R 13/53 |
| | | | | 439/181 |
| 6,296,497 B1 * | 10/2001 | Xu | ............... | H02G 15/103 |
| | | | | 439/744 |
| 6,392,157 B2 * | 5/2002 | Arioka | ............... | 174/142 |
| 7,690,933 B1 * | 4/2010 | Smith | ............... | H01R 13/53 |
| | | | | 439/181 |
| 7,972,155 B1 * | 7/2011 | Siebens | ............... | H01R 13/53 |
| | | | | 439/181 |
| 8,408,925 B2 * | 4/2013 | Borgstrom | ............... | H01R 3/00 |
| | | | | 439/181 |
| 8,641,434 B2 * | 2/2014 | Siebens | ............... | H01R 13/53 |
| | | | | 439/181 |

\* cited by examiner

DETACHABLE CABLE JOINT WITH THREE SOCKETS

CROSS-REFERENCE TO RELATED APPLICATIONS

This application is a continuation of PCT International Application No. PCT/EP2013/050591 filed Jan. 14, 2013.

FIELD OF THE INVENTION

The invention relates to cable joint and, more particularly, to a detachable cable joint with three sockets.

BACKGROUND

Cable connectors having a plurality of sockets are known. For instance, U.S. Pat. No. 4,865,559 and European Patent No. EP 0 510 019 B1 generally disclose known cable connectors having a plurality of sockets.

SUMMARY

An object of the invention, among others, is to provide a detachable cable joint having a slim and robust design for low-cost detachable cable joints that allow connection, disconnection and grounding of cables without cable movement.

The detachable cable includes a housing having a first socket, a second socket, a third socket, a first contact member, and a second contact member. The second socket is positioned adjacent to the first socket, while the third socket is positioned adjacent to the first socket and separate from the second socket. The first contact member connects the first socket and the second socket, while the second contact member connects the first socket and the third socket.

BRIEF DESCRIPTION OF THE DRAWINGS

The invention will now be described, by way of example, with reference to the accompanying drawings, of which.

DETAILED DESCRIPTION OF THE EMBODIMENT(S)

Figure 1:
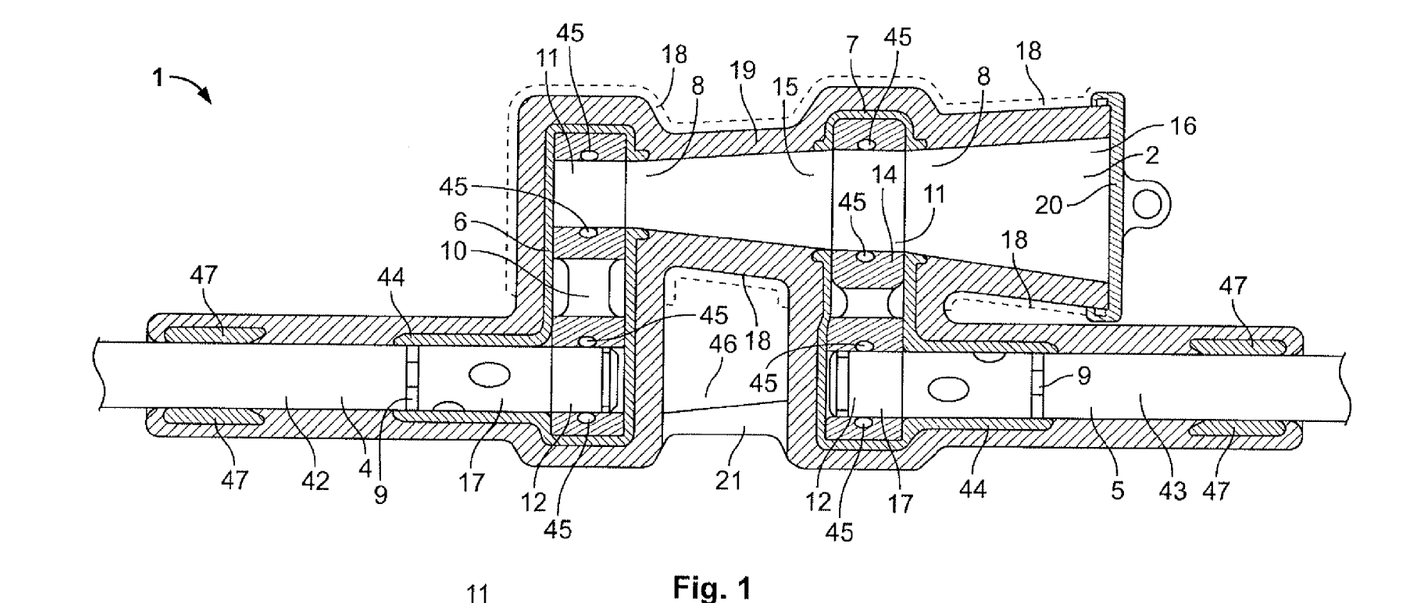
FIG. 1 is a sectional view of a detachable cable joint according to the invention.

With reference to FIG. 1, a detachable cable joint 1 is shown and includes a housing 19 with three sockets; a first socket 2, a second socket 4, and a third socket 5.

The first socket 2 is arranged and dimensioned for receiving a plug 16. The second socket 4 is arranged and dimensioned for receiving an end of a first cable 42. The third socket 5 is arranged and dimensioned for receiving a second cable 43.

The detachable cable joint 1 includes a first contact member 10 connecting the first and the second socket 2, 4, and a second contact member 14 connecting the first and the third socket 2, 5.

The first contact member 10 is arranged within a first cage 6. The first cage 6 includes a first plug receiving passageway 8 for receiving a section of the plug 16. The first cage 6 also includes a first cable receiving passageway 9 arranged within the second socket 4 for receiving a connector and a short section of the first cable 42 that is connected to an electrical conductor of the first cable 42. In the shown embodiment, the first cage 6 embodies a Faraday cage and improves the electrical stress in the insulation of the housing 19 of the detachable cable joint 1. Depending on the embodiment, the first cage 6 can be omitted.

The housing 19 is made of electrically insulating material, e.g. plastic or rubbers (e.g. EPDM) or silicones or thermoplastic elastomers or the like. Longitudinal axes of the first and the second socket 2, 4 are arranged in parallel and separated by a given distance. The longitudinal axis of the third socket 5 is arranged in line with the longitudinal axis of the second socket 4. In the shown embodiment, the second socket and third socket are oriented in opposite directions, facing away from the detachable cable joint 1.

A second cage 7 is provided and arranged within the third socket 5 and includes another first plug receiving passageway 8, a second cable receiving passageway 9, and a second plug receiving passageway 15. The first and the second plug receiving passageways 8, 15 of the second cage 7 are arranged in the first socket 2. The first and second plug receiving passageway 8, 15 are disposed for the plug which protrudes into the second cage 7. The second contact member 14 is disposed within the second cage 7. The second contact member 14 includes a first contact receiving section 11 which is arranged within the first socket 2. The second contact member 14 includes a contact receiving section 12 which is arranged within the third socket 5. An end 17 of a conductor of the second cable 43 is arranged within the contact receiving section 12 of the second contact member 14. The end 17 of the conductor may also be electrically connected to a cable receiving section 44 of the second cage 7. The cable receiving section 44 is, for example, embodied as a sleeve, receiving a cylindrical connector 17 of the conductor of the second cable 43 and a short section of the cable insulation of the cable 43.

In order to improve the electrical connection between the end 17 of cable 43 and/or the second contact member 14, contacts 45 may be provided. The contacts 45 may for example be embodied as electrically conducting spring elements. Also, contacts 45 may be disposed between the plug 16 and the second contact member 14. Moreover, contacts 45 may be disposed between the first contact member 10 and the plug 16 and/or between the first contact member 10 and the end 17 of the electrical conductor of the first cable 42. Furthermore, the first contact member 10 may include a thread within the first contact receiving section 11. In the shown embodiment, the plug 16 may also include a thread at its end. Thus, the plug 16 can be screwed into the first contact member 10.

Also, the first cage 6 may include a cable receiving section 44 which is arranged in the second socket 4 and which encompasses the end 17 of the conductor of the first cable 42 and a section of the cable insulation. The first, the second and the third socket 2, 4, 5 are arranged in the shown embodiment of FIG. 1 in one plane. The first and the second cage 6, 7 are embodied in an almost identical manner, wherein the second cage 7 includes the first and the second plug receiving passageways 8, 15 in the first socket 2, whereas the first cage 6 includes the first plug receiving passageway 8 in the first socket 2. The first and the second cages 6, 7 may be made of metal. Other preferable options are to make the first and second cage from flexible materials e.g. EPDM, silicones; TPEs. Further, the material selected could be similar to the material of the housing 19. Also, the first and the second contact members 10, 14 may be made of metal which is electrically conductive.

In the shown embodiment, the first and the second contact member 10, 14 are arranged in parallel to each other, wherein a longitudinal axis of the first and the second contact member 10, 14 are inclined by 90° to a longitudinal axis of the first socket 2 and the longitudinal axes of the second and third socket 4, 5. In the shown embodiment, the openings of the second and third socket 4, 5 are arranged at opposite sides of the detachable cable joint 1.

The first socket 2 is closed by a cap 20, which may be secured to the housing 19. The housing 19 covers the first and the second cages 6, 7, wherein a gap 46 is provided between parts of the housing covering the lower parts of the first and second cages 6, 7. Depending on the embodiment, there may be a bridge 21 which connects the two housing parts covering the lower sections of the first and second cages 6, 7.

The ends 17 of the conductors of the first and the second cable 42, 43 are each electrically connected to the respective first or second contact members 10, 14. The housing 19 is made of electrically insulating material. For this reason, without a plug 16, the two conductors of the two cables 42, 43 are not electrically connected. If an electrical connection between the conductors of the two cables 42, 43 is required, an electrically conducting plug 16 is positioned into the first socket 2. The mounted plug 16 is in contact with the first and the second contact member 10, 14, electrically connecting the first and second contact members 10, 14. In the shown embodiment, the plug 16 may be at least partially made of metal. If an electrical disconnection of the two cables is required, the cap 20 is removed and then the plug 16 is removed from the first socket 2.

In the shown embodiment, the first socket 2 includes an inner tapering and has a frusto-conical shape. The plug 16 is respectively tapered and has a frusto-conical configuration and shaped to the first socket 2. Due to the frusto-conical shape of the plug 16, the first contact receiving section of the second contact member 14 has a larger cross-sectional area than the first contact receiving section 11 of the first contact member 10. The second and third socket 4, 5 may have a cylindrical shape.

Depending on the used embodiment, stress cones 47 may be arranged in the housing 19 adjacent to the second and third socket 4, 5.

In other embodiments, the second and third sockets 4, 5 may not have stress cones 47, but adapters with stress cones are used that are mounted onto the cables 42, 43 and are inserted into second and third sockets 4, 5. Furthermore, a shell 18 may be disposed covering at least a part of the outer face of the housing 19. The shell 18 may be made of a stiffer material than the housing 19. The shell 18 improves the stiffness of the housing 19 and the shape of the first socket 2. The shell 18 may be made of metal. The material and dimensions of the housing 19 may be selected in such a way that the joint generates a radial pressing force on the plug 16 and/or ends 17 of the conductor of the cables 42, 43. However, the pressing force should not be too high. Thus, it is of advantage to use a smooth material for the housing and to use a stiffer shell 18 to stabilize the shape of the detachable cable joint.

Figure 2:
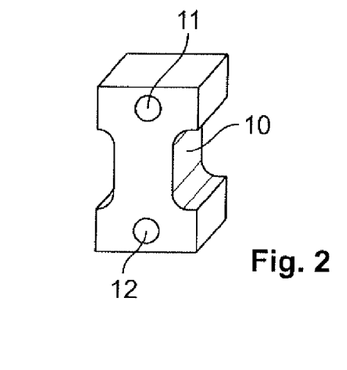
FIG. 2 is a perspective view of a contact member of the detachable cable joint according to the invention.
Figure 3:
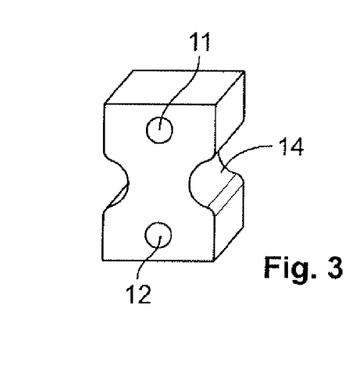
FIG. 3 is a perspective view of another contact member of the detachable cable joint according to the invention

With respect to FIG. 2, the first contact member 10 is shown and includes the first and the second contact receiving section 11, 12. In a schematic diagram, FIG. 3 shows the second contact member 14 with the first and the second contact receiving sections 11, 12. As discussed above, the first contact receiving section 11 of the second contact member 14 has a larger cross-sectional area than the first contact receiving section 11 of the first contact member 10.

Figures 4, 5:
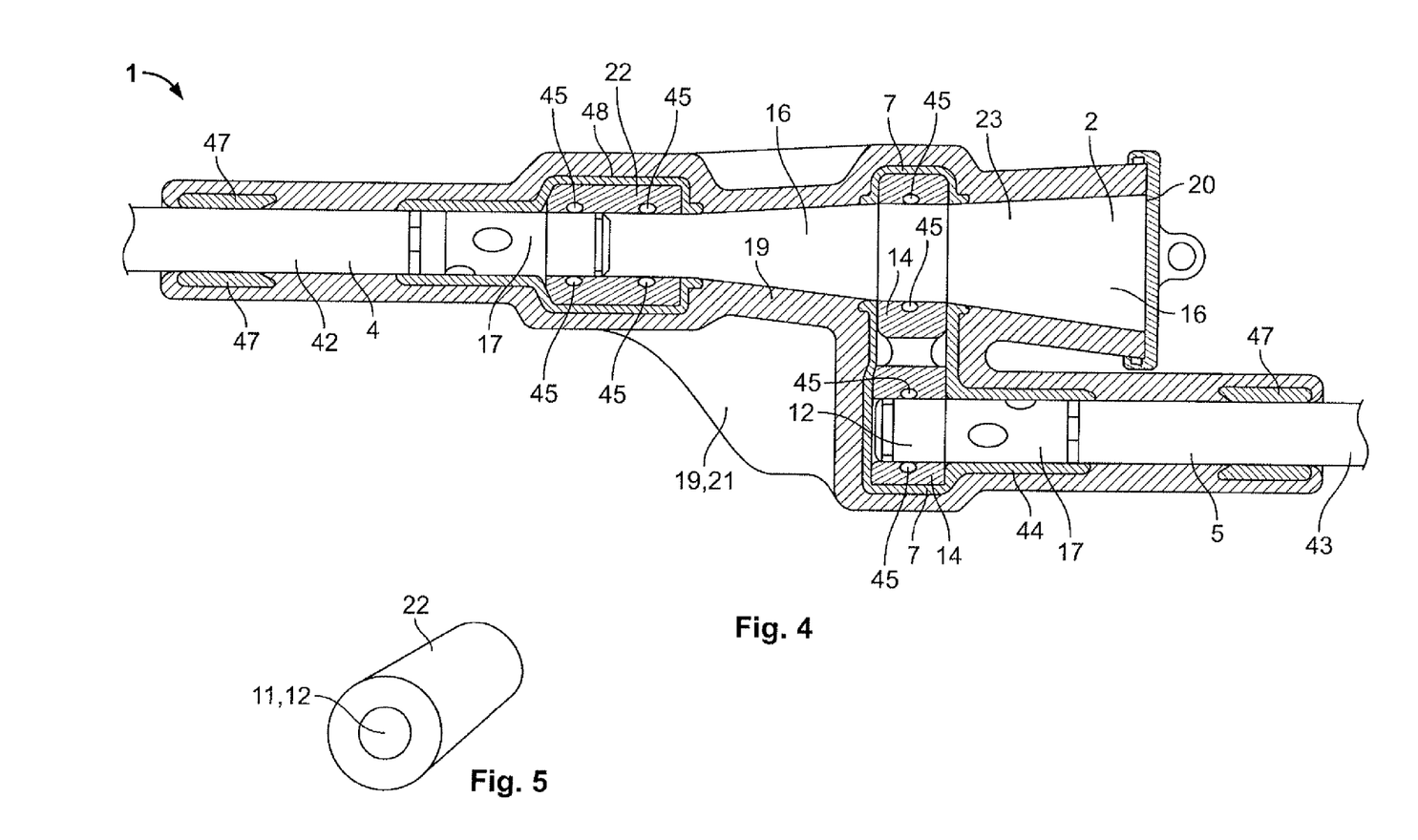
FIG. 4 is a sectional view of another detachable cable joint according to the invention.
FIG. 5 is a perspective view of a contact member of the detachable cable joint of FIG. 4.

With reference to FIGS. 4 and 5, another detachable cable joint 1 according to the invention is shown, wherein the first socket 2 and the second socket 4 are arranged along a common longitudinal axis 23. The longitudinal axis of the third socket 5 and the first socket 2 are arranged in parallel but off set from the common longitudinal axis 23 of the first socket 2 and the second socket 4. However, the second and third socket 4, 5 extend in opposite directions with regard to the detachable cable joint 1. Also, in the shown embodiment, the first, second and third socket 2, 4, 5 are arranged in one plane. The second contact member 14 and the second cage 7 are the same as in FIG. 1. However, instead of having a first contact member, as described above, a third contact member 22 is provided and is a sleeve in the embodiment shown. The third contact member 22 receives an end 17 of the conductor of the first cable 42 along one end thereof and an end section of the plug 16 at an opposite end thereof. Additionally, contacts 45 may be arranged in the third contact member 22 in order to improve the electrical contact between the conductor of the cable 42 and/or the plug 16. The third contact member 22 is surrounded by a third cage 48. In the shown embodiment, the third cage 48 embodies a Faraday cage having mainly the shape of a sleeve. The third cage 48 has a first section which receives the end 17 of the conductor of the first cable 42 and the cable insulation and a second section encompassing the third contact member 22 and a part of the plug 16. The second section has a larger cross-sectional area than the first section. The second section could have a thread for receiving the plug which may be a lower cost solution than using contacts 45.

Figures 6, 7:
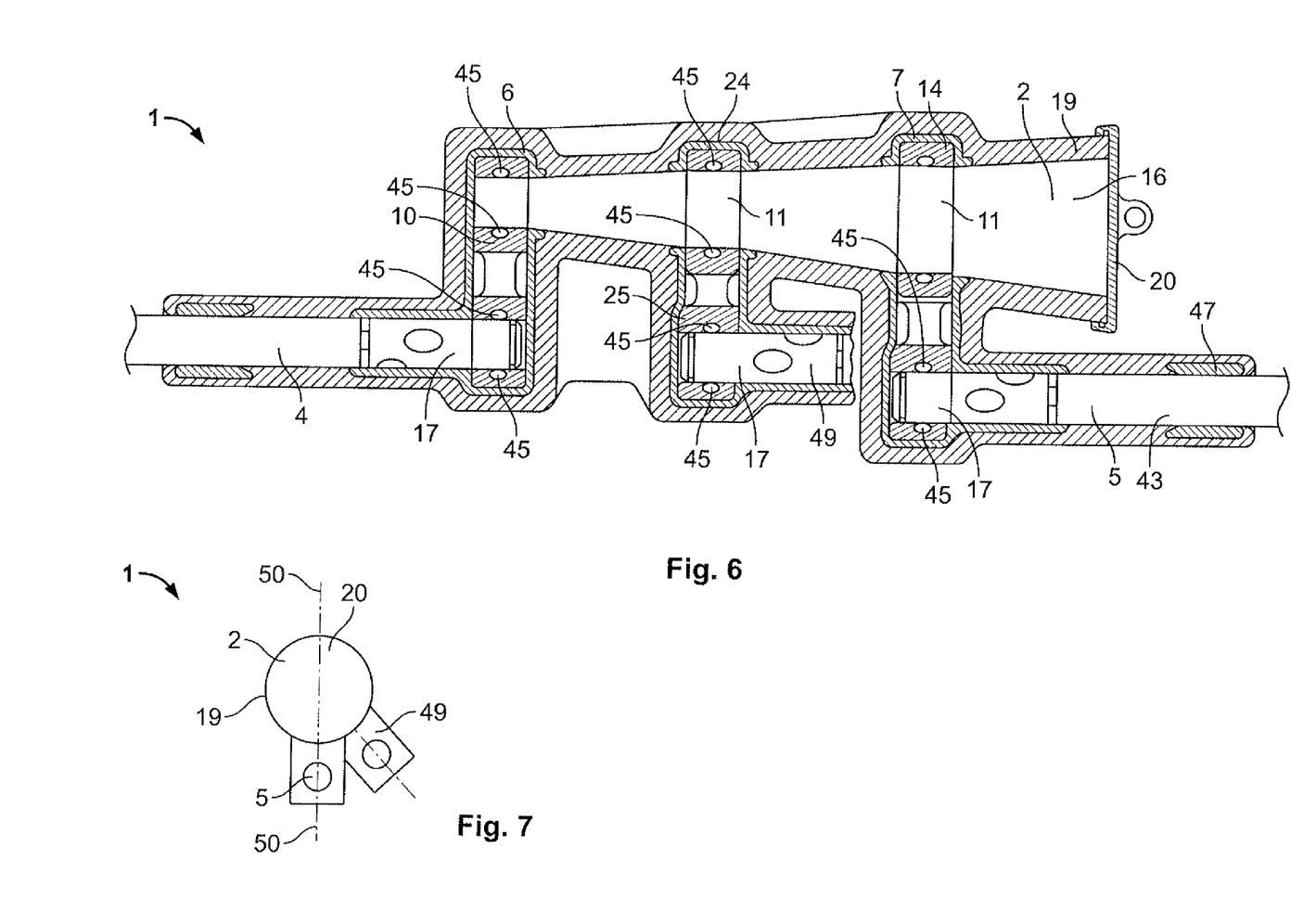
FIG. 6 is a sectional view of another detachable cable joint according to the invention.
FIG. 7 is a schematic cross-sectional view of the detachable cable joint of FIG. 6.

With reference to FIGS. 6 and 7, another detachable cable joint 1 according to the invention is shown and generally has the same structure as the detachable cable joint of FIG. 1. However, a fourth socket 49 is provided and arranged between the first and the second socket 2, 4. The fourth socket 49 includes a fourth cage 24 and a fourth contact member 25. The fourth contact member 25 has a shape similar to the second contact member 14. Moreover, the fourth cage 24 has a similar shape as the second cage 7. A cross-sectional area of the first contact receiving section 11 of the fourth contact member 25 is smaller than the first contact receiving section 11 of the second contact member 14. Furthermore, in the shown embodiment, a longitudinal axis of the second socket 4 is arranged in parallel to the longitudinal axis of the third socket 5, but is separated from the third socket 5 by a fixed predetermined distance. The first, the second, and third sockets 2, 4, 5 are arranged in one plane. The fourth socket 49 in parallel with and between the second and the third socket 4, 5. Further options are to arrange all four sockets in any other planes and the axes might be parallel or have any other angle.

For instance, as shown in FIG. 7, an opening of the first socket 2 is aligned along a shared common plane 50 with the second and the third sockets 2, 4, 5 (as depicted as a dashed line). However, while the fourth socket 49 is arranged beside the second and third socket 4, 5, the fourth contact member 25 is arranged at an angle with regard to the common plane 50. The embodiment shown in FIG. 6 allows for the possibility of connecting, disconnecting or grounding one, two as all three cables in any possible combination.

Figure 8:
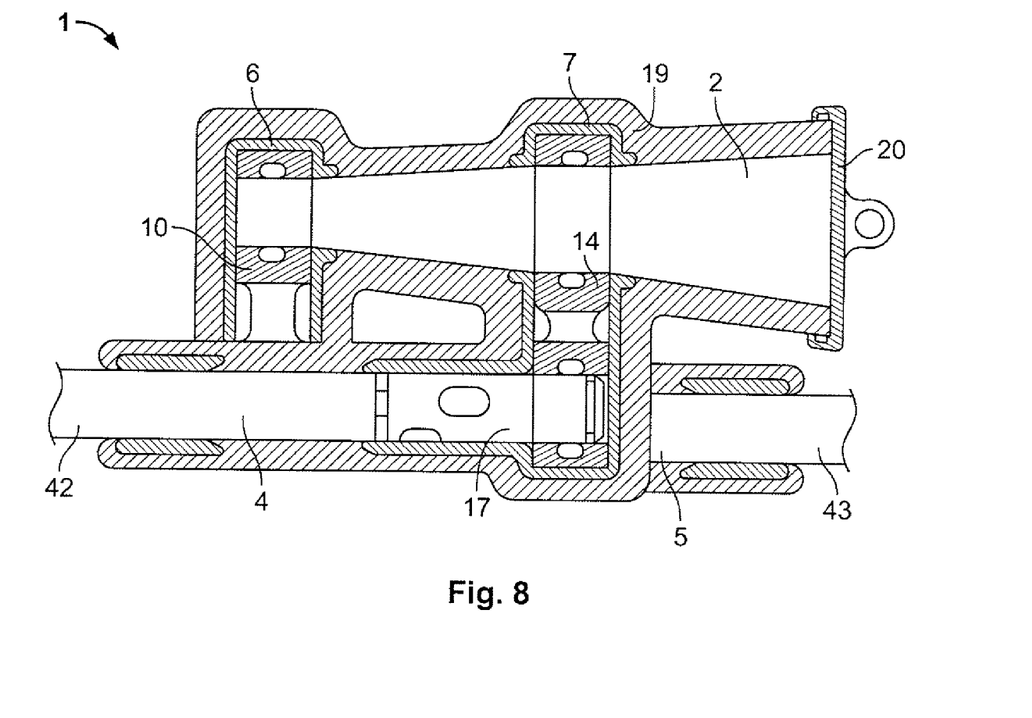
FIG. 8 is a sectional view of another detachable cable joint according to the invention.
Figure 9:
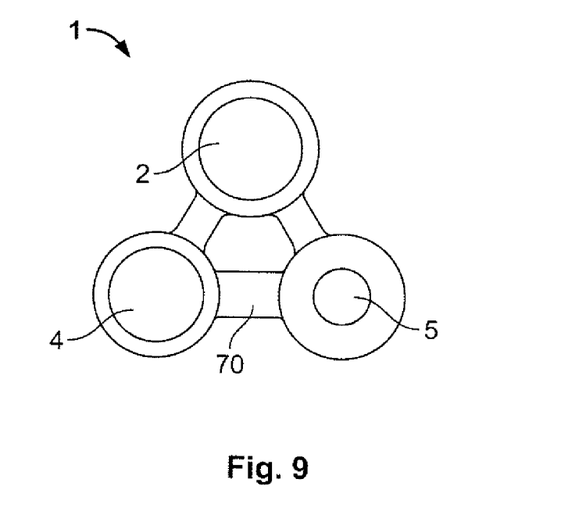
FIG. 9 is a schematic cross-sectional view of the detachable cable joint of FIG. 8.

With respect to FIGS. 8 and 9, another detachable cable joint 1 is shown and generally has the same structure as the detachable cable joint 1 of FIG. 1, wherein the second and third socket 4, 5 are directed in opposite directions. However, the second and third socket 4, 5 are not arranged in the same plane.

As shown in FIG. 9, an opening of the first socket 2 and an opening of the second socket 4 are offset with respect to each other. In the shown embodiment, the first and second contact member 10, 14 are inclined with regard to each other at a predetermined angle of about 45°. An additional bridge 70 is provided to increase the rigidity of the joint.

Figure 10:
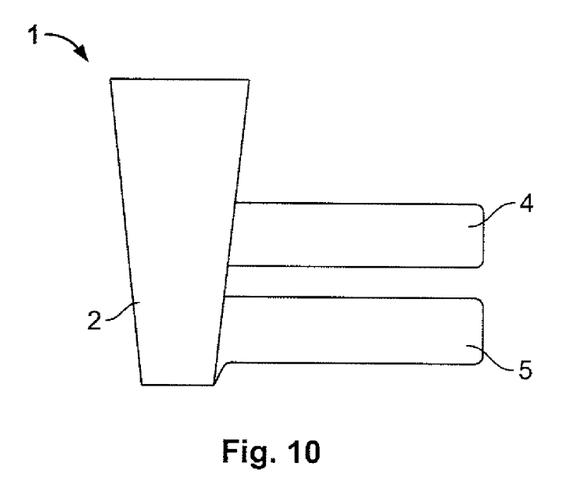
FIG. 10 is a schematic diagram of another detachable cable joint according to the invention.

With respect to FIG. 10, another detachable cable joint 1 according to the invention is shown, wherein the first socket 2 is arranged perpendicularly to a longitudinal axis of the second socket 4 and the third socket 5. The second socket 4 and the third socket 5 are arranged in parallel. The basic structure of the detachable cable joint of FIG. 10 is generally the same as shown in FIG. 1.

Figure 11:
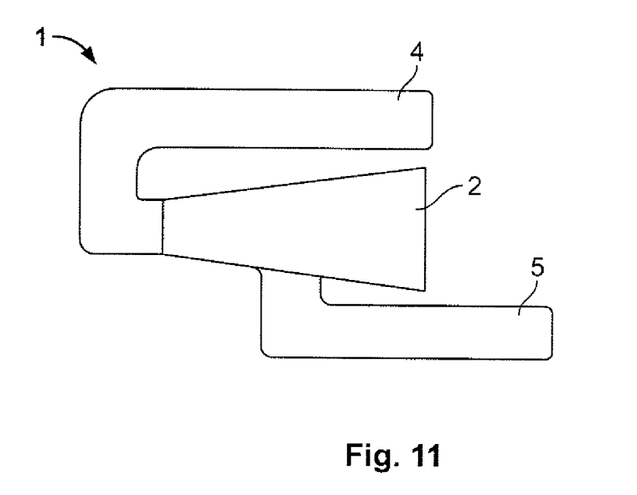
FIG. 11 is a schematic diagram of another detachable cable joint according to the invention.

With respect to FIG. 11, another detachable cable joint 1 according to the invention is shown and generally has the same structure as the detachable cable joint 1 wherein the second and third socket 4, 5 are disposed in one plane with the first socket 2. However, all sockets are positioned on a common side.

Figures 12, 13:
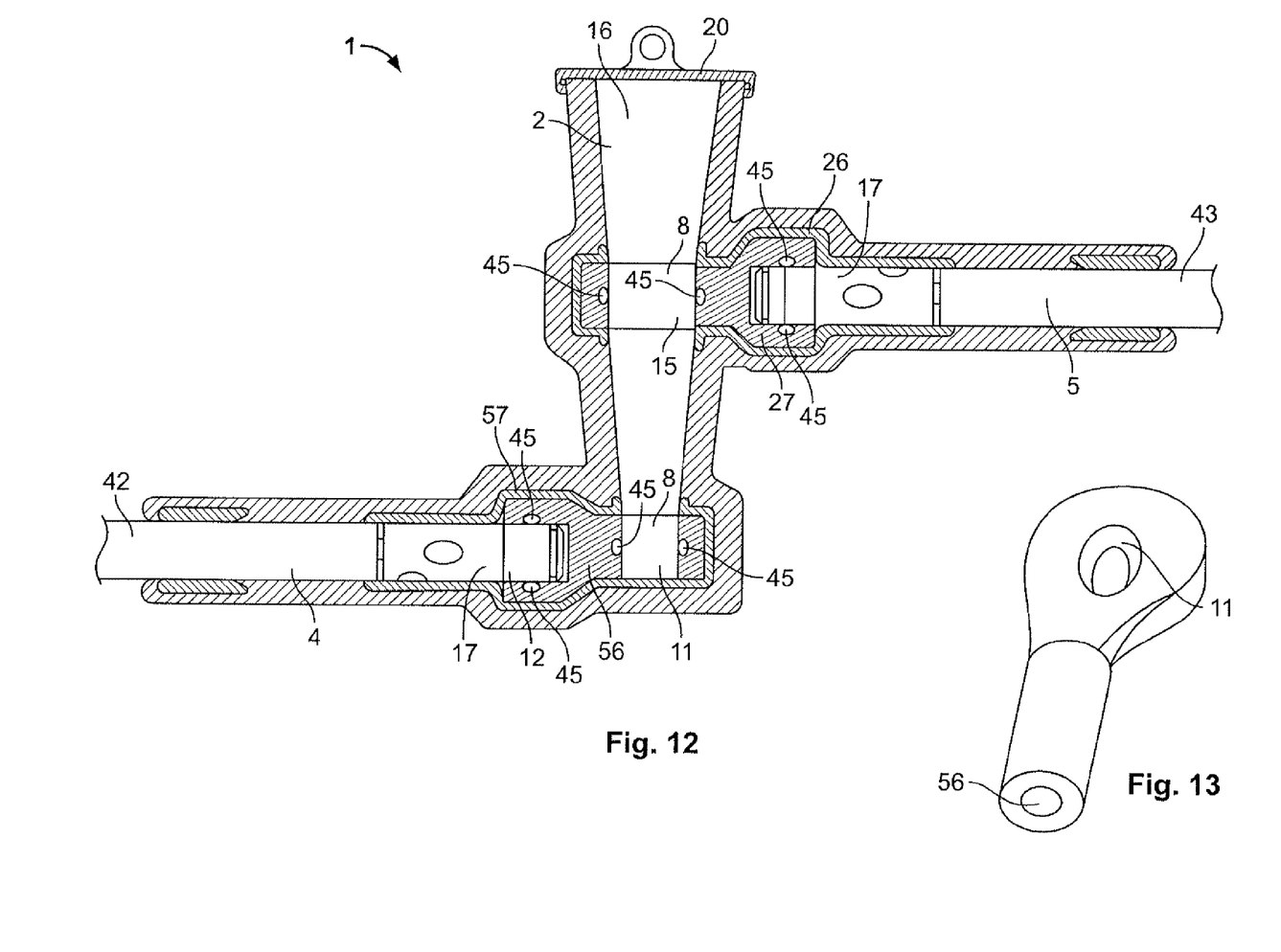
FIG. 12 is a sectional view of another detachable cable joint according to the invention.
FIG. 13 is a perspective view of a contact member of the detachable cable joint of FIG. 12.

With respect to FIGS. 12 and 13, another detachable cable joint 1 according to the invention is shown, wherein the first socket 2 is arranged perpendicularly to the second and the third socket 4, 5. The second and third socket 4, 5 extend in opposite directions. The detachable cable joint 1 includes a tenth cage 57 and a tenth contact member 56 which provide the electrical contact for the second socket 4. The tenth contact member 56 is positioned along a longitudinal axis perpendicularly disposed to a longitudinal axis of the first socket 2. The tenth contact member 56 includes a first contact receiving section 11 for receiving an end part of the plug 16. In addition, the tenth contact member 56 includes a contact receiving section 12 which is arranged along the longitudinal axis of the second socket 4. The third socket 5 includes a fifth contact member 27 which is arranged within a fifth cage 26. The fifth contact member 27 generally has the same shape as the fourth contact member 25, wherein the first contact receiving section 11 has a larger cross-sectional area. The fifth cage 26 generally has the same shape as the tenth cage 57 wherein the fifth cage 26 has a first and a third plug receiving passageway 8, 15. The tenth cage 57 only has a first plug receiving passageway 8. Between the plug 16 and the tenth and/or the fifth contact member 56, 27, contacts 45 may be arranged. Moreover, contacts 45 may be arranged between the ends 17 of the conductor of the cables 42, 43. The embodiment of FIG. 12 has an advantage in that the cables 42, 43 may be buried in the ground or in a tunnel or in a tower and the first socket 2 which receives the plug 16 and which is covered by the cap 20 can be easily reached from above. Thus, an easy access to the first socket 2 and the plug 16 is possible.

Figure 14:
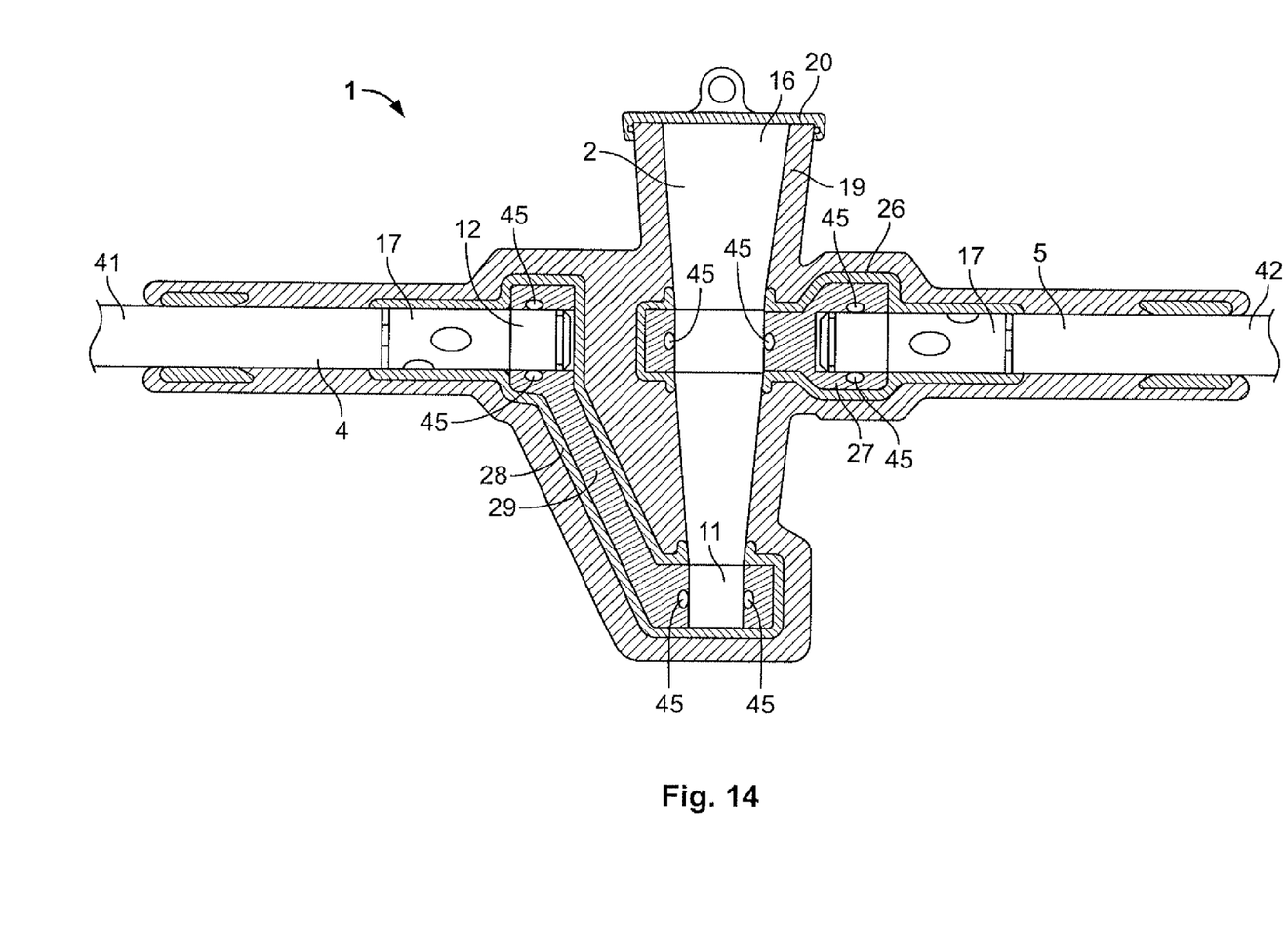
FIG. 14 is a sectional view of another detachable cable joint according to the invention.

With respect to FIG. 14, another detachable cable joint 1 according to the invention is shown, wherein the second and third socket 4, 5 are arranged at opposite sides of the first socket 2. In the shown embodiment, the second socket 4 is disposed on the same axis as the third socket 5. The third socket 5 is embodied as shown in FIG. 12. The second socket 4 includes a sixth contact member 29 which is arranged within a sixth cage 28. The sixth contact member 29 includes a first contact receiving section 11 for receiving an end part of the plug 16 and a second opening 12 for receiving an end 17 of a conductor of the first cable 42. The sixth contact member 29 is embodied as an arm with the two contact receiving sections 11, 12 at the two endings of the arm. The two contact receiving sections 11, 12 are embodied as cylindrical holes wherein the longitudinal axes are arranged at an angle of 90° with regard to each other. Thus, it is possible to receive a part of the plug 16 by means of the first contact receiving section 11, and to receive the end 17 of the conductor of the first cable 41 by means of the contact receiving section 12. Also, the second socket 4 is arranged at an angle of 90° with regard to the longitudinal axis of the first socket 2. The sixth cage 28 covers the whole sixth contact member 29 and provides a cylindrical receiving section for the end 17 of the conductor of the first cable 42 positioned in the second socket 4. In the shown embodiment, the sixth contact member 29 is guided to an end section of the first socket 2. However, this is not necessary. It is sufficient if the sixth contact member 29 is guided to the first socket 2 on a different level than the fifth contact member 27. In further embodiments, the axis of the second and third socket 4, 5 may be arranged in a non-aligned arrangement, e.g. with an angle of 45° or 90°.

Figure 15:
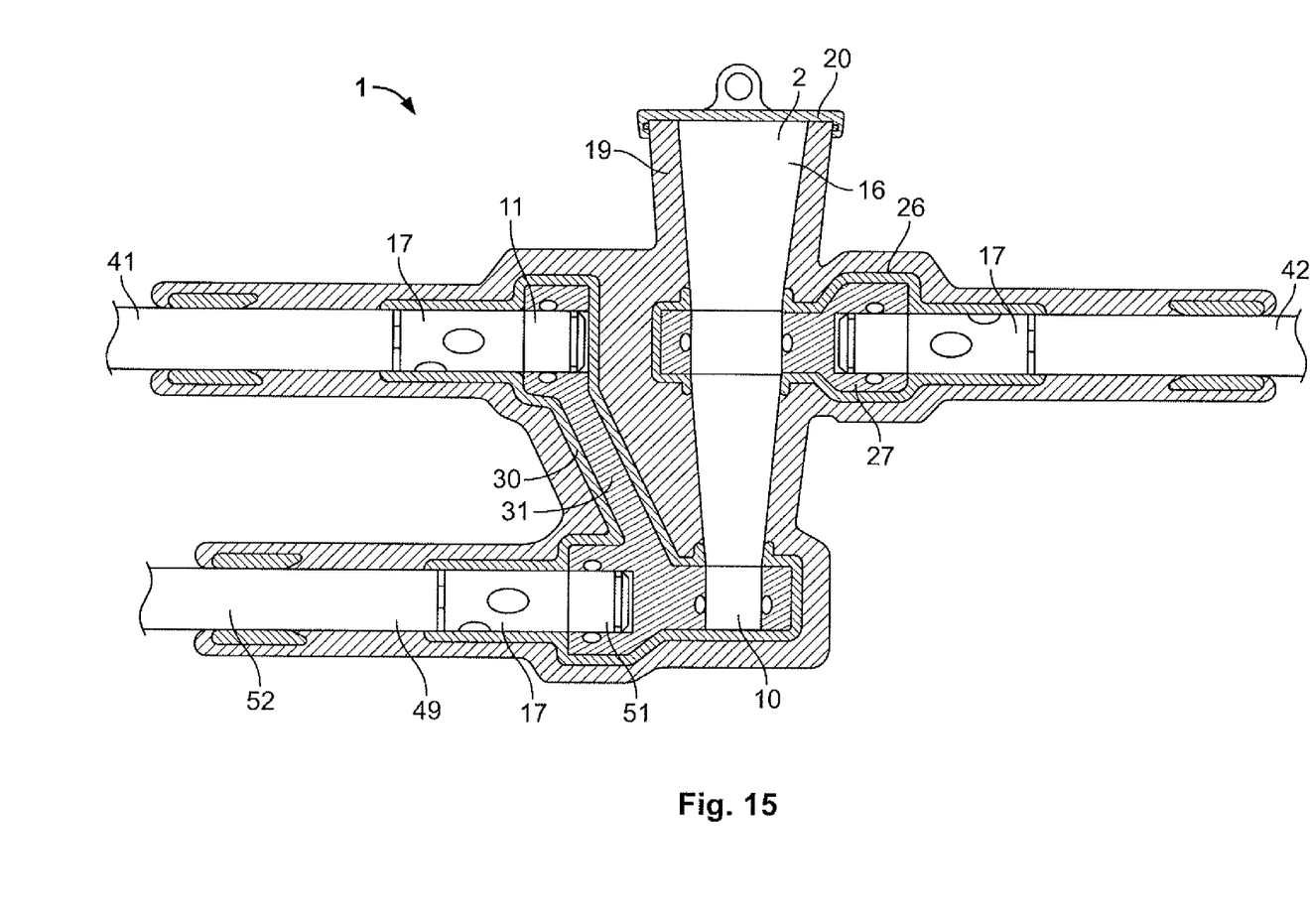
FIG. 15 is a sectional view of another detachable cable joint according to the invention.

With respect to FIG. 15, another detachable cable joint 1 according to the invention is shown, and generally includes the same structure as the detachable cable joint of FIG. 14, wherein a fourth sockets 49 is arranged in parallel to the second socket 4 and in the same plane as the second and third socket 4, 5. However, in the shown embodiment, a seventh contact member 31 is provided which basically has the same structure as the sixth contact member 29 and additionally includes a third contact receiving section 51 for receiving an end 17 of a conductor of a third cable 52 and the cable insulation. A seventh cage 30 encompasses the seventh contact member 31 which provides a receiving section for the end 17 of the first cable 41 and a second receiving section for the end of the conductor of the third cable 52. The second receiving section is arranged in the fourth socket 49. A longitudinal axis of the fourth socket 49 is arranged perpendicularly to a longitudinal axis of the first socket 2. Depending on the embodiment, the sockets may also be directed to different angles around to longitudinal axis of the first socket 2 and in different planes.

Figure 16:
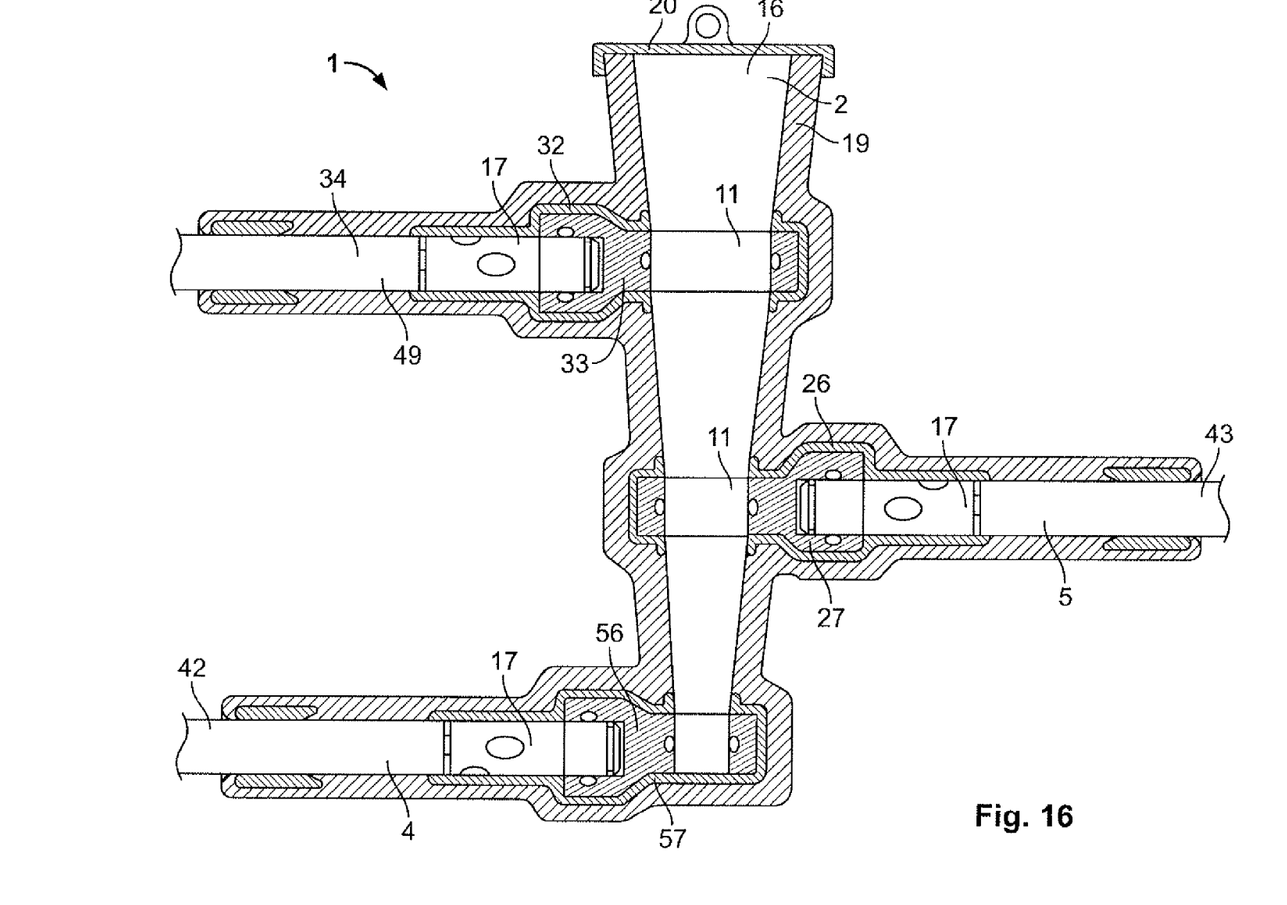
FIG. 16 is a sectional view of another detachable cable joint according to the invention.

With respect to FIG. 16, another detachable cable joint 1 according to the invention is shown and generally has the same structure as the detachable cable joint 1 of FIG. 12. As shown, a fourth socket 49 is additionally arranged for receiving an end 17 of a conductor of a third cable 34. A longitudinal axis of the fourth socket 49 is arranged in parallel to a longitudinal axis of the second and third socket 4, 5. An eighth contact member 33 is arranged within the fourth socket 49. The eighth contact member 33 is surrounded by an eighth cage 32. The eighth contact member 33 is embodied with the same structure as the fifth contact member 27. The eighth cage 32 is embodied with the same structure as the fifth cage 26. Due to the frusto-conical shape of the first socket 2, the first contact receiving section 11 of the eighth contact member 33 has a larger cross-sectional area than the first contact receiving section 11 of the fifth contact member 27. In the shown embodiment, three cables may be mounted to the detachable cable joint 1. The four sockets 2, 4, 5, 49 are arranged in one plane wherein the third socket 5 is arranged at an opposite side referring to the second and fourth socket 4, 49. Depending on the used embodiment, the sockets may also be directed to different angles around to longitudinal axis of the first socket 2 and in different planes.

Figure 17:
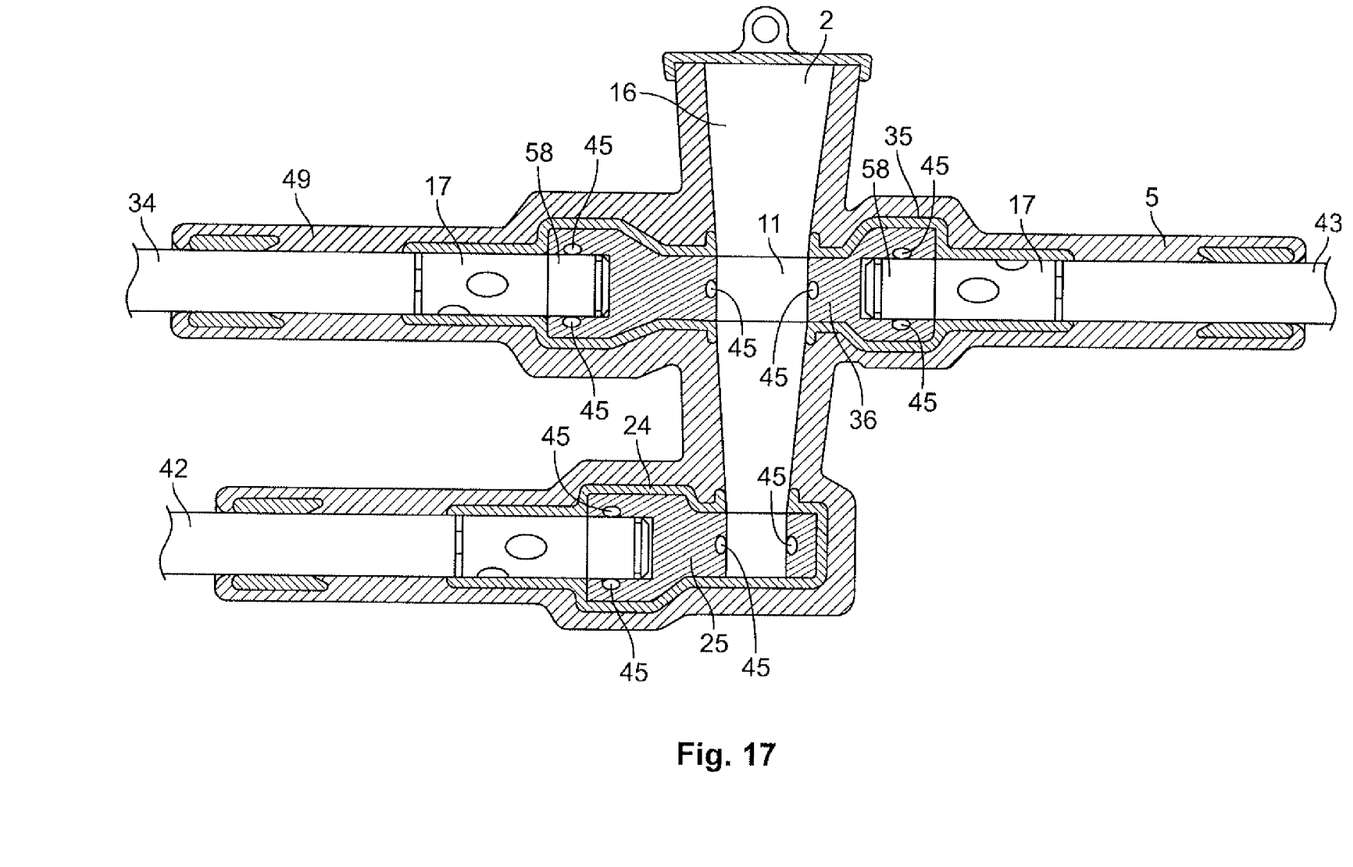
FIG. 17 is a sectional view of another detachable cable joint according to the invention.
Figure 18:
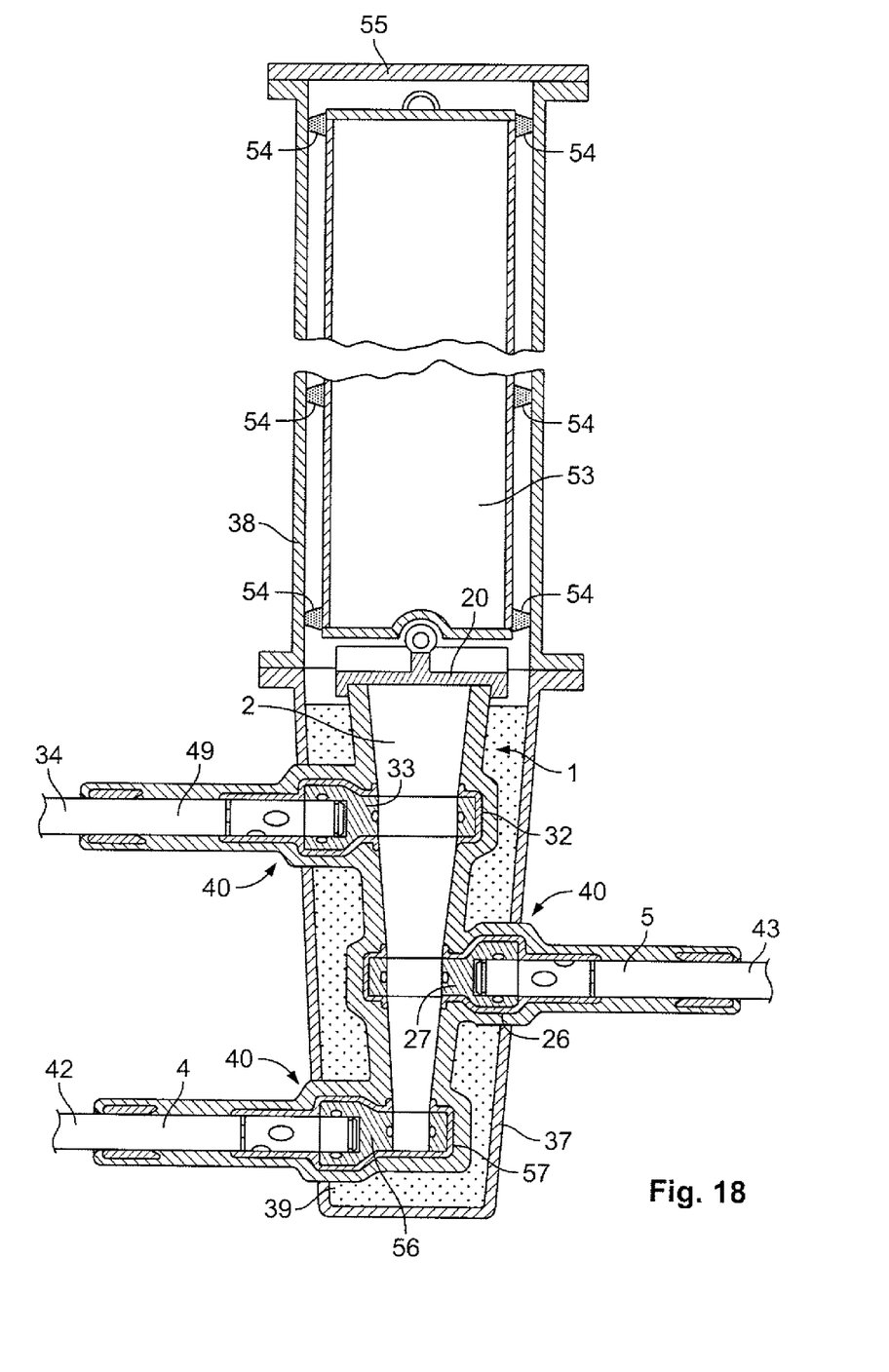
FIG. 18 is a sectional view of another detachable cable joint according to the invention that is arranged in a container with an additional tube on a side with a first socket.

With respect to FIGS. 17 and 18, another detachable cable joint 1 according to the invention is shown, wherein the third and fourth socket 5, 49 are arranged at the same level of the first socket 2. The shown embodiment provides the possibility of using a ninth contact member 36 to electrically connect a second and third cable 43, 34, also without a plug 16 or with a modified plug like in FIGS. 12, 14. The ninth contact member 36 includes, at opposite sides, further contact receiving sections 58, embodied as blind holes in the shown embodiment, for receiving ends 17 of conductors of a second and a third cable 43, 34. The ninth contact member 36 includes a first contact receiving section 11 for receiving the plug 16. The ninth contact member 36 is covered by a ninth cage 35 which provides two receiving sections for the two ends 17 of the two cables. The detachable cable joint of FIG. 17 provides continuous electrical connection between the conductors of the second and third cable 43, 34 with or without the plug 16.

As shown in FIG. 18, the detachable cable joint 1 of FIG. 16 is arranged within a container 37. The container 37 includes a bottom with a conical tube. A longitudinal axis of the first socket 2 is arranged along the longitudinal axis of the container 37. The container 37 includes several socket receiving sections 40. The second, third and fourth socket 4, 5, 49 are guided through the respective socket receiving section 40. A gap between the detachable cable joint 1 and the container 37 can be filled up with filler material 39. The filler material 39 may be embodied as a resin (PUR, GURO, and epoxy), an elastomeric material (e.g. silicone, EPDM or the like) preferable with low store hardness, a gel, and a high viscosity liquid or concrete or such like. The filler material can also be a foamed material rather than a solid material. A certain compressibility of the filler material may be of advantage. A cross-section of the second, third and fourth socket 4, 5, 49 have the same diameter as the cross-section of the socket receiving sections 40. Thus, the socket receiving sections 40 are sealed by the respective sockets. The socket receiving sections 40 may be larger in diameter than sockets 4, 5, 49 and a separate sealing means e.g. heat shrink sleeve, cold shrink sleeve or the like is used. The filler material 39 supports the detachable cable joint within the container 37. Furthermore, through a filling of the container 37, waste or moisture is prevented by the filler material 39. In the shown embodiment, the container 37 includes an access tube 38 above the detachable cable joint 1, wherein within the access tube 38, a fill member 53 is arranged. The fill member 53 may include a cylindrical cross-section as the access tube 38. The fill member 53, the access tube 38 and the container 37 may be made of plastic PE, PP, PVC, . . . ) or metal stainless steel) or concrete or foam from e.g. PE foam, PUR foam, EPDM foam, silicone foam or such like. The fill member 53 may include a rod made of rigid material, e.g. plastic covered with a foam. In the shown embodiment, the seals 54 may be omitted wherein the sealing is achieved by a tight fit of the fill member i.e. the foam. In addition, seals 54 may surround the fill member 53. The seals 54 which may have the structure of a ring to prevent moisture from flowing down the detachable cable joint 1 and/or particles from falling down to the detachable cable joint 1 during removal of the fill member 53 from the access tube 38. The access tube 38 is covered by a cover plate 55. In order to access the detachable cable joint 1, the cover plate 55 is removed from the access tube 38. The fill member 53 is then pulled out of the access tube 38, wherein the seals 54 slide along an inner face of the access tube 38. The cap 20 can then be pulled off the housing 19 of the detachable cable joint 1. The plug 16 may subsequently be removed in order to disconnect the conductors of the three cables 42, 43, 34. Depending on the plug 16 used, the conductors of the three cables are e.g. isolated from each other or e.g. two of the three cables are connected to each other or any other combination of connection, isolation and grounding. Depending on the embodiment, the access tube 38 may be a separate piece which is fixed to the container 37.

Figure 19:
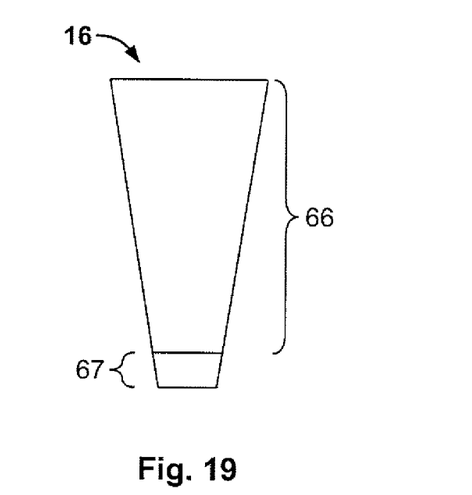
FIG. 19 is a schematic diagram of a plug for a detachable cable joint according to the invention.

With respect to FIG. 19, a plug 16 according to the invention is shown. The plug 16 includes a first frustoconical section 66 and a second cylindrical section 67. The plug 16 is as a whole configured from electrically conductive material, e.g. metal. Alternatively, the metal may be surface coated or overmolded with insulation material (e.g. epoxy resin).

Figure 20:
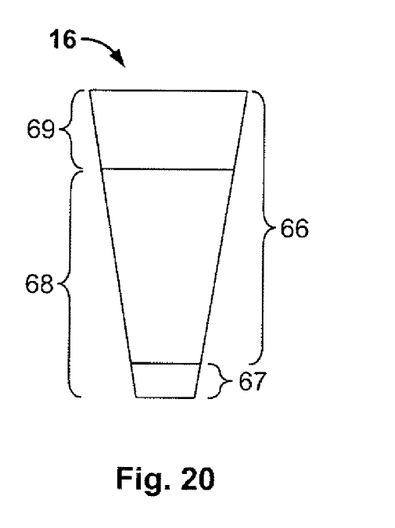
FIG. 20 is a schematic diagram of another plug for a detachable cable joint according to the invention.

With respect to FIG. 20, another plug 16 is shown, wherein a lower part 68 of the plug 16 is made of electrically conducting material. An upper part 69 of the plug 16 is made of electrically insulating material. Using this type of plug 16, all contact members which are in contact with the lower part 68 are electrically connected to each other. The contact members which are in contact with the upper part 69 are not electrically connected to further contact members.

Figure 21:
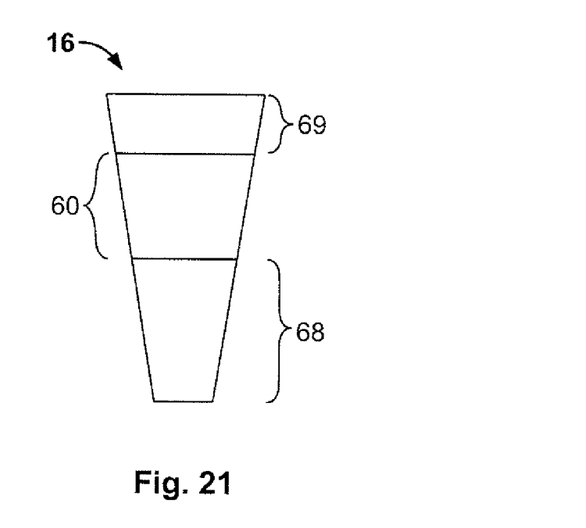
FIG. 21 is a schematic diagram of another plug for a detachable cable joint according to the invention.

With respect to FIG. 21, another plug 16 is shown. The plug 16 is divided up into a lower part 68, a middle part 60 and an upper part 69. The different parts are made from different materials, e.g. the lower part 68 and the upper part 59 are made from insulating material. The middle part 60 may consist of electrically conducting material. In a further embodiment, the upper part 69 and the lower part 68 may be made of electrically conducting material. Depending on the plug used, different contact members and therefore different cables may be electrically connected or grounded.

In further embodiments, the middle part 60, having a conductive material, may extend through the upper part made from insulating material. This can allow grounding of the middle part 60.

The detachable cable joint or parts of it, e.g. the sockets 4, 5, 49, may be designed in a pre-expanded condition and shrunk on the cables, or the detachable cable joint or parts of it, e.g. the sockets 4, 5, 49, may be designed for a push-on mounting of the cable.

The detachable cable joint may be built by moulding the cages and the insulation from flexible material, e.g. LSR, HTV, EPDM, TPE or the like materials or the contact members to one another in one part with rigid insulating material between e.g. epoxy resins. This assembly is then overmolded with soft rubber, e.g. LSR, HTV, EPDM, TPE or the like soft materials to form the housing. The detachable cable joint may be used for high-voltage applications, e.g. in the range of 12 to 42 kV, or for applications in the low voltage area below 1 kV or in the high voltage area. The contact members of all embodiments may also be connected to an external element, e.g. grounding means.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A detachable cable joint comprising:
   a housing having:
   a first socket;
   a second socket positioned adjacent to the first socket;
   a third socket positioned adjacent to the first socket and electrically isolated from the second socket unless a plug is positioned in the first socket;
   a first contact member connecting the first socket and the second socket; and
   a second contact member connecting the first socket and the third socket.

2. The detachable cable joint according to claim 1, wherein the first socket, the second socket, and the third socket are arranged along a common plane.

3. The detachable cable joint according to claim 2, wherein the second socket and the third socket extend in opposite directions.

4. The detachable cable joint according to claim 1, wherein a longitudinal axis of the first socket is arranged at an angle with respect to a longitudinal axis of the second socket.

5. The detachable cable joint according to claim 4, wherein the angle is greater than 10°.

6. The detachable cable joint according to claim 1, wherein a longitudinal axis of the first socket is arranged at an angle with respect to a longitudinal axis of the third socket.

7. The detachable cable joint according to claim 6, wherein the angle is greater than 10°.

8. A detachable cable joint comprising:
   a housing having:
   a first socket;
   a second socket positioned adjacent to the first socket;
   a third socket positioned adjacent to the first socket and separated from the second socket;
   a fourth socket;
   a first contact member connecting the first socket and the second socket;
   a second contact member connecting the first socket and the third socket; and
   a third contact member connecting the fourth socket to the first socket.

9. The detachable cable joint according to claim 8, wherein a longitudinal axis of the fourth socket is parallel to a longitudinal axis of the second socket or the third socket.

10. A detachable cable joint comprising:
    a housing having:
    a first socket;
    a second socket positioned adjacent to the first socket;
    a third socket positioned adjacent to the first socket and separated from the second socket;
    a first contact member connecting the first socket and the second socket;
    a second contact member connecting the first socket and the third socket; and
    a first cage receiving the first contact member and including a plug receiving passageway positioned in the first socket and a first cable receiving passageway positioned in the second socket.

11. The detachable cable joint according to claim 10, further comprising a second cage receiving the second contact member.

12. The detachable cable joint according to claim 11, wherein the second cage includes a pair of plug receiving passageways positioned in the first socket and a second cable receiving passageway positioned in the third socket.

13. A detachable cable joint comprising:
    a housing having:
    a first socket;
    a second socket positioned adjacent to the first socket;
    a third socket positioned adjacent to the first socket and separated from the second socket;
    a first contact member connecting the first socket and the second socket and including a first contact receiving section positioned in the first socket and a second contact receiving section positioned in the second socket; and
    a second contact member connecting the first socket and the third socket.

14. The detachable cable joint according to claim 13, wherein the second contact member includes a third contact receiving section positioned in the first socket and a fourth contact receiving section positioned in the third socket.

* * * * *